United States Patent [19]

Goto et al.

[11] 4,130,546

[45] Dec. 19, 1978

[54] THERMOSETTING RESIN COMPOSITION

[75] Inventors: Kazuo Goto, Hitachi; Shinichi Toyoda, Katsuta; Masahiko Sakai, Hitachi, all of Japan

[73] Assignee: Hitachi Chemical Company, Ltd., Japan

[21] Appl. No.: 843,206

[22] Filed: Oct. 18, 1977

[30] Foreign Application Priority Data

Oct. 19, 1976 [JP] Japan .................................. 51-125227
Oct. 21, 1976 [JP] Japan .................................. 51-126645
Oct. 30, 1976 [JP] Japan .................................. 51-131418
Nov. 4, 1976 [JP] Japan .................................. 51-132553

[51] Int. Cl.² ............................................ C08L 63/00
[52] U.S. Cl. ...................................... 528/73; 260/836; 260/837 R; 528/75
[58] Field of Search ........... 260/47 EC, 47 EP, 2 EC, 260/2 EP, 836, 837, 77.5 AM; 526/11.2

[56] References Cited

U.S. PATENT DOCUMENTS

| | | | |
|---|---|---|---|
| 3,459,828 | 8/1969 | Michelotti et al. | 260/830 |
| 3,496,250 | 2/1970 | Czerwinski | 260/836 |
| 3,525,779 | 8/1970 | Hawkins | 260/830 |
| 3,636,133 | 1/1972 | Hawkins | 260/824 EP |
| 4,055,541 | 10/1977 | Riew | 260/47 EN |

*Primary Examiner*—Harold D. Anderson
*Assistant Examiner*—E. A. Nielsen
*Attorney, Agent, or Firm*—Craig & Antonelli

[57] ABSTRACT

A thermosetting resin composition comprising a polyfunctional epoxy compound such as diglycidyl ether of bisphenol A, a polyfunctional isocyanate such as diphenylmethane diisocyanate, a curing agent and a polybutadiene type homopolymer having terminal hydroxyl groups or copolymer having terminal amino groups, or a reaction product of a polyfunctional epoxy compound or an epoxy compound having halogen atom(s) and a polybutadiene type homopolymer or copolymer having terminal hydroxyl groups or terminal carboxyl groups can produce cured articles excellent in heat resistance, crack resistance and fire resistance.

11 Claims, No Drawings

THERMOSETTING RESIN COMPOSITION

This invention relates to a thermosetting resin composition excellent in heat resistance and crack resistance.

In recent years, miniaturization and weight-saving or various electronic parts and electric devices have been desired. In order to attain such a desire, it becomes necessary to develop resins which are used for sealing a part or whole of these materials and have more excellent heat resistance. In compliance with such requirement, the present inventors have developed thermosetting resin compositions containing polyfunctional epoxy compounds, polyfunctional isocyanate compounds and curing catalysts. (Japanese Patent Application Kokoku (Post-Exam. Publn.) No. 31,000/77) Cured articles obtained from these compositions have heat resistance higher than class H but when used as sealing mediums for electric devices and the like containing complicated inserts (sealed materials), peeling of the inserts and cracks often occur due to cycles of cooling and heating during practical operation under more severe practical application conditions, which lowers function of the devices. In order to improve such defects, there have been proposed a method of bringing expansivity of a cured sealing medium to that of an insert by increasing compounding proportion of an inorganic filler to the sealing medium so as to lower expansivity of the sealing medium, and a method of making a cured sealing medium flexible by compounding an agent of imparting flexibility with said thermosetting resin composition. In the former method, however, there are many disadvantages in that when the proportion of the inorganic filler becomes larger, not only there increases a tendency to damage the surface of insert by the inorganic filler, but also there lowers the proportion of the resin in the sealing medium, said resin being in contact with the surface of insert, which lowers adhesion or bonding between the insert and the sealing medium and often generates peeling. On the other hand, in the latter method, since heat resistance of agents of imparting flexibility generally used are insufficient, thermal degradation of the agent of imparting flexibility by heating cycles often lowers heat resistance of the cured sealing medium itself.

It is an object of this invention to provide a thermosetting resin composition which is excellent in heat resistance and crack resistance, and contains an agent of imparting flexibility without lowering heat resistance.

In addition to miniaturization and weight-saving of various electronic parts and electric devices, fire resistance is also strongly required. Therefore resins used for sealing a part or whole of them are also required to be more excellent in heat resistance and fire resistance.

Thus, it is another object of this invention to provide a thermosetting resin composition containing a fire resistant flexibility imparting agent without lowering heat resistance, said composition being excellent in heat resistance, fire resistance and crack resistance.

This invention provides a thermosetting resin composition comprising
(a) one or more polyfunctional epoxy compounds,
(b) one or more polyfunctional isocyanates,
(c) one or more curing agents, and
(d) at least one flexibility imparting agent selected from the group consisting of a polymer of butadiene having terminal amino groups represented by the formula:

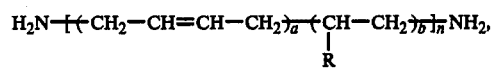

or

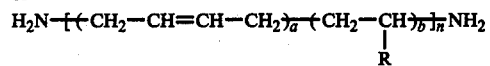

wherein R is a hydrogen atom, an alkyl preferably having 1–10 carbon atoms, alkenyl preferably having 1–10 carbon atoms, nitrilo or phenyl group; $a \geq 0.7$, $b \leq 0.3$, and $a + b = 1$; and n is an integer which determines the molecular weight of the polymer of butadiene in the range of from 500 to 5,000, a polybutadiene having terminal hydroxyl groups represented by the formula:

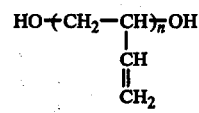

wherein n is an integer which determines the molecular weight of the polybutadiene in the range of from 500 to 5,000, a reaction product obtained by reacting a polyfunctional epoxy compound or an epoxy compound containing one or more halogen atoms with a polymer of butadiene of the formula:

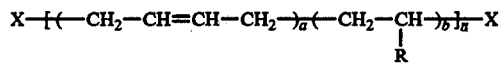

or

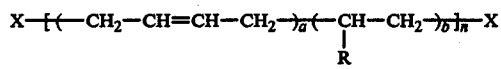

wherein X is a hydroxyl or carboxyl group; and R, a, b and n are as defined above.

As the polyfunctional epoxy compounds, the component (a), there can be used bifunctional epoxy compounds such as diglycidyl ether of bisphenol A, butadiene diepoxide, 3,4-epoxycyclohexylmethyl-(3,4-epoxy)-cyclohexane carboxylate, vinylcyclohexene dioxide, 4,4'-di(1,2-epoxyethyl) diphenyl ether, 4,4'-(1,2-epoxyethyl) biphenyl, 2,2-bis(3,4-epoxy-cyclohexyl) propane, diglycidyl ether of resorcin, diglycidyl ether of phloroglucinol, diglycidyl ether of methylphloroglucinol, bis(2,3-epoxycyclopentyl) ether, 2-(3,4-epoxy)cyclohexane-5,5-spiro(3,4-epoxy)-cyclohexane-m-dioxane, bis(3,4-epoxy-6-methylcyclohexyl) adipate, N,N'-m-phenylenebis(4,5-epoxy-1,2-cyclohexanedicarboxyimide), and the like; tri- or higher polyfunctional epoxy compounds such as triglycidyl ether of para-aminophenol, polyallyl glycidyl ether, 1,3,5-tri(1,2-epoxyethyl) benzene, 2,2',4,4'-tetraglycidoxy benzophenone, tetraglycidoxy tetraphenyl methane, tetraglycidoxy tetraphenyl ethane, polyglycidyl ether or phenol-formaldehyde novolac, triglycidyl ether of glycerin, triglycidyl ether of trimethylolpropane, triglycidyl isocyanurate, polyglycidyl ether of cresol-formaldehyde novolac, and the like.

As the polyfunctional isocyanates, the component (b), there can be used bifunctional isocyanates such as methane diisocyanate, butane-1,2-diisocyanate, butane-1,1-diisocyanate, ethane-1,2-diisocyanate, trans-vinylene diisocyanate, propane-1,3-diisocyanate, butane-1,4-diisocyanate, 2-butene-1,4-diisocyanate, 2-methylbutane-1,4-diisocyanate, pentane-1,5-diisocyanate, 2,2-dimethylpentane-1,5-diisocyanate, hexane-1,6-diisocyanate, heptane-1,7-diisocyanate, octane-1,8-diisocyanate, nonane-1,9-diisocyanate, decane-1,10-diisocyanate, dimethylsilane diisocyanate, diphenylsilane diisocyanate, ω, ω'-1,3-dimethylbenzene diisocyanate, ω, ω'-1,4-dimethylbenzene diisocyanate, ω, ω'-1,3-dimethylcyclohexane diisocyanate, ω, ω'-1,4-dimethylcyclohexane diisocyanate, ω, ω'-1,4-dimethylbenzene diisocyanate, ω, ω'-1,4-dimethylnaphthalene diisocyanate, ω, ω'-1,1'-dimethylnaphthalene diisocyanate, ω, ω'-1,5-dimethylnaphthalene diisocyanate, cyclohexane-1,3-diisocyanate, cyclohexane-1,4-diisocyanate, dicyclohexylmethane-4,4'-diisocyanate, 1,3-phenylene diisocyanate, 1,4-phenylene diisocyanate, 1-methylbenzene-2,4-diisocyanate, 1-methylbenzene-2,5-diisocyanate, 1-methylbenzene-2,6-diisocyanate, 1-methylbenzene-3,5-diisocyanate, diphenyl ether-4,4'-diisocyanate, diphenyl ether-2,4'-diisocyanate, naphthalene-1,4-diisocyanate, naphthalene-1,5-diisocyanate, biphenyl-4,4'-diisocyanate, 3,3'-dimethylbiphenyl-4,4'-diisocyanate, 2,3'-dimethoxybiphenyl-4,4'-diisocyanate, diphenylmethane-4,4'-diisocyanate, 3,3'-dimethoxydiphenylmethane-4,4'-diisocyanate, 4,4'-dimethoxydiphenylmethane-3,3'-diisocyanate, diphenylsulfide-4,4'-diisocyanate, diphenylsulfone-4,4'-diisocyanate, and the like; trior higher polyfunctional isocyanates such as polymethylene polyphenyl isocyanates, triphenylmethane triisocyanate, tris(4-phenyl isocyanate thiophosphate), 3,3',4,4'-diphenylmethane tetraisocyanate, and the like. There can also be used dimers and trimers of these isocyanates.

There can also be used halogenated polyfunctional isocyanates as the polyfunctional isocyanates, the component (b). Examples of the halogenated isocyanates are 1-bromomethylbenzene-2,6-diisocyanate, 1-chlorobenzene-2,4-diisocyanate, 1,3-dichlorobenzene-2,4-diisocyanate, 1-bromomethylbenzene-2,4-diisocyanate, 1-bromobenzene-2,4-diisocyanate, 1,3-dibromobenzene-2,4-diisocyanate, and the like.

It is preferable to use 0.1 to 25.0 equivalent quantity of the polyfunctional isocyanate, more preferably to use 1.5 to 15.0 equivalent quantity of the polyfunctional isocyanate, per 1.0 equivalent quantity of the polyfunctional epoxy compound.

The polymers of butadiene having terminal amino groups are polybutadiene type polymers represented by the formula:

$$H_2N-[(CH_2-CH=CH-CH_2)_a-(CH-CH_2)_b]_n-NH_2,$$
$$\qquad\qquad\qquad\qquad\qquad\qquad\quad |$$
$$\qquad\qquad\qquad\qquad\qquad\qquad\quad R$$

or $$H_2N-[(CH_2-CH=CH-CH_2)_a-(CH_2-CH)_b]_n-NH_2$$
$$\qquad\qquad\qquad\qquad\qquad\qquad\qquad\qquad |$$
$$\qquad\qquad\qquad\qquad\qquad\qquad\qquad\qquad R$$

wherein R, a, b and n are as defined above. In the above formulas, n can be an integer of, for example, from 10 to 110, and b can be zero. The polymers of butadiene having terminal hydroxyl groups of terminal amino groups can contain the units of the formulas

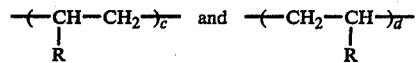

wherein c + d = b, at the same time.

The polymers of butadiene having terminal amino groups can be obtained, for example, by reacting polymers of butadiene having terminal hydroxyl groups such as liquid rubbers Poly bd ® R - 45M, R - 45HT, CS - 15, CN - 15 (trade names, Idemitsu Petrochemical Co., Ltd.) with an excess amount of ammonia. Commercially available polymers of butadiene having terminal amino groups are Hycar ATBN 1300 × 16 (trade name, manufactured by Ube Industries, Ltd.), and the like.

Molecular weight of the polymers of butadiene having terminal amino groups is in the range of 500 to 5,000. If the molecular weight is more than 5,000, the viscosity increases and workability is unfavorably lowered, whereas if the molecular weight is less than 500, no cured article having high toughness can be obtained and crack resistance shows a tendency to be lowered unfavorably. In order to obtain cured articles having higher toughness, i.e., excellent crack resistance, a and b in the above-mentioned formulas should be a ≧ 0.7 and b ≦ 0.3.

In order to obtain excellent physical properties of cured articles, particularly in heat resistance and crack resistance, 3 to 100 parts by weight of the copolymer of butadiene having terminal amino groups is preferably mixed with 100 parts by weight of the total of the component (a) polyfunctional epoxy compound, the component (b) polyfunctional isocyanate, and the component (c) curing agent.

The polybutadienes having terminal hydroxyl groups can be represented by the formula:

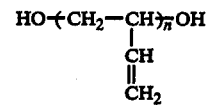

wherein n is an integer which determines the molecular weight of the polybutadiene in the range of from 500 to 5,000, for example n is an integer of 17 to 92.

The polybutadienes having terminal hydroxyl groups can be obtained by preparing a living polymer using as a polymerization initiator n-butyl-Li complex, Na-naphthalene complex, Li-naphthalene complex, Li-methylnaphthalene or the like, in the presence of a solvent such as tetrahydofuran, pentane, benzene, diethyl ether, toluene, cyclohexane, heptane or the like and using a conventional polymerization technique, and reacting said living polymer with an alkylene oxide, an aldehyde, a ketone or the like. The polybutadienes having terminal hydroxyl groups usually have 90% by weight or more of 1,2 content. Commercially available polybutadienes having terminal hydroxyl groups are NISSO-PB G-1000, NISSO-PB G-2000, NISSO-PB G-3000 (trade names, manufactured by Nippon Soda Co., Ltd.) and the like.

Molecular weight of the polybutadienes having terminal hydroxyl groups is in the range of 500 to 5,000. If the molecular weight is more than 5,000, the viscosity increases and workability is unfavorably lowered, whereas if the molecular weight is less than 500, no cured article having high toughness can be obtained and crack resistance shows a tendency to be lowered unfavorably.

In order to obtain excellent physical properties of cured articles, particularly in heat resistance and crack resistance, 3 to 100 parts by weight of the polybutadiene having terminal hydroxyl groups is preferably mixed with 100 parts by weight of the total of the components (a), (b) and (c).

The polymers of butadiene having terminal hydroxyl groups or terminal carboxyl groups are polybutadiene type polymers represented by the formula:

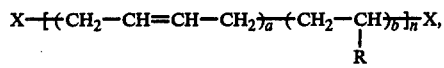

or

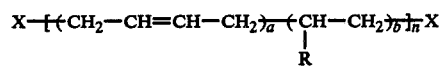

wherein X, R, a, b and n are as defined above. The copolymers of butadiene having terminal hydroxyl groups or terminal carboxyl groups can contain the units of the formulas:

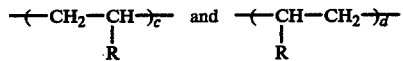

wherein $c + d = b$, at the same time.

The polymers of butadiene having terminal hydroxyl groups can be obtained by activating the both ends of a polymer of butadiene obtained by polymerizing butadiene and ethylene, styrene, acrylonitrile, propylene, 1-butene, 2-butene, 1,3-butadiene, 1,4-pentadiene or the like using as a catalyst n-butyllithium complex, Na-naphthalene complex, Li-naphthalene complex, Li-methylnaphthalene or the like in the presence of a solvent such as tetrahydrofuran, pentane, benzene, diethyl ether, toluene, cyclohexane, heptane or the like and using a conventional polymerization technique, said activation being able to be carried out by the reaction using an alkylene oxide, an aldehyde, a ketone or the like. Commercially available polymers of butadiene having terminal hydroxyl groups are liquid rubbers Poly bd ® R - 45M, R - 45HT, CS - 15, CN - 15 (trade names, manufactured by Idemitsu Petrochemical Co., Ltd.), and the like.

Molecular weight of the polymers of butadiene having terminal hydroxyl groups is in the range of from 500 to 5,000. If the molecular weight is more than 5,000, the viscosity increases and workability is unfavorably lowered, whereas if the molecular weight is less than 500, no cured article having high toughness can be obtained and crack resistance shows a tendency to be lowered unfavorably. In order to obtain excellent crack resistance, a and b in the above-mentioned formulas should be a ≧ 0.7 and b ≦ 0.3.

The polymers of butadiene having terminal carboxyl groups can be obtained by, for example, preparing a polymer of butadiene and ethylene or the like using a conventional polymerization technique, and reacting said polymer with an excess amount of carbon dioxide. Commercially available polymers of butadiene having terminal carboxyl groups are NISSO-PB C-1000, NISSO-PB C-2000 (trade names, manufactured by Nippon Soda Co., Ltd.), Hycar CTB 2000 × 162, Hycar CTBN 1300 × 8, Hycar CTBN 1300 × 13, Hycar CTBN 1300 × 15 (trade names, manufactured by Ube Industries, Ltd.).

Molecular weight of the polymers of butadiene having terminal hydroxyl groups or terminal carboxyl groups is in the range of from 500 to 5,000. If the molecular weight is more than 5,000, the viscosity increases and workability is unfavorably lowered, whereas if the molecular weight is less than 500, no cured article having high toughness can be obtained and crack resistance shows a tendency to be lowered unfavorably. In order to obtain cured articles having higher toughness, i.e., excellent crack resistance, a and b in the above-mentioned formulas should be a ≧ 0.7 and b ≦ 0.3.

The reaction products obtained by reacting a polyfunctional epoxy compound of an epoxy compound containing one or more halogen atoms with the polymer of butadiene having terminal hydroxyl groups or terminal carboxyl groups mentioned above can be prepared, for example, as follows. A mixture of 100 parts by weight of the polymer of butadiene mentioned above and 5 to 200 parts by weight of a polyfunctional epoxy compound as mentioned in the component (a) or an epoxy compound containing one or more halogen atoms is heated in the presence or absence of a catalyst at 100°–170° C.

Examples of the epoxy compounds containing one or more halogen atoms in the molecule are glycidyl ethers of halogenated phenols such as brominated epoxy compounds obtained by using tetrabromobisphenol A or dibromobisphenol A as a starting material, chlorinated epoxy compounds obtained by using tetrachlorobisphenol A or dichlorobisphenol A as a starting material, brominated epoxy compounds obtained by using dibromophenol or tribromophenol as a starting material, brominated epoxy compounds obtained by forming glycidyl ethers of p-bromophenol novolac, and the like. So far as they are polyfunctional, they can also be used as the component (a).

In order to obtain excellent physical properties of cured articles, particularly in heat resistance and crack resistance, 3 to 100 parts by weight of the reaction product obtained by reacting a polyfunctional epoxy compound or an epoxy compound containing one or more halogen atoms with the copolymer of butadiene having terminal hydroxyl groups or terminal carboxyl groups is preferably mixed with 100 parts by weight of the total of the components (a), (b) and (c).

As the curing agents, the component (c), which can form isocyanurate rings and oxazolidone rings in the molecular structure on the heat reaction of the composition of this invention, there can be used amines, quaternary ammonium salts, imidazoles, organic compounds containing at least one atom belonging to the group of Vb of the periodic table, and the like.

Examples of the amines are oxyalkylamines such as trimethylamine, triethylamine, tetramethylbutanediamine, tetramethylpentanediamine, tetramethylhexanediamine, dimethylamino-ethanol, dimethylaminopenthanol, and the like; dimethylaniline, tris-dimethylaminomethyl phenol (DMP - 30), N-methyl morpholine, N-ethyl morpholine, triethylenediamine, N,N-dimethylaniline, N,N-dimethylbenzylamine, tributylamine, tripropylamine, N-methylpiperazine, N-ethylpiperazine, N-methylpiperidine, and the like.

Examples of the quaternary ammonium salts are cetyltrimethylammonium bromide, cetyltrimethylammonium chloride, dodecyltrimethylammonium iodide, trimethyldodecylammonium chloride, benzyldimethyltetradecylammonium chloride, benzyldimethylpalmitylammonium chloride, allylcoconuttrimethylammonium bromide, allyldodecyltrimethylammonium bromide, benzyldimethylstearylammonium bromide, stearyltrimethylammonium chloride, benzyldimethyltetradecylammonium acetylate, and the like.

Examples of the imidazoles are 2-methylimidazole, 2-ethylimidazole, 2-phenylimidazole, 2-undecylimidazole, 2-heptadecylimidazole, 2-methyl-4-ethylimidazole, 1-butylimidazole, 1-propyl-2-methylimidazole, 1-benzyl-2-methylimidazole, 1-cyanoethyl-2-methylimidazole, 1-cyanoethyl-2-undecylimidazole, 1-cyanoethyl-2-phenylimidazole, 1-(4,6-diamino-s-triazinyl-2-ethyl)-2-methylimidazole, 1-(4,6-diamino-s-triazinyl-2-ethyl)-2-phenylimidazole, 1-(4,6-diamino-s-triazinyl-2-ethyl)-2-isopropylimidazole, 1-(4,6-diamino-s-triazinyl-2-ethyl)-2-ethylimidazole, 1-(4,6-diamino-s-triazinyl-2-ethyl)-2-undecylimidazole, and the like.

Examples of the organic compounds containing at least one atom belonging to the group Vb of the periodic table are compounds of P, As, Sb, Bi, and N in combination with tetrasubstituted borates represented by the formulas:

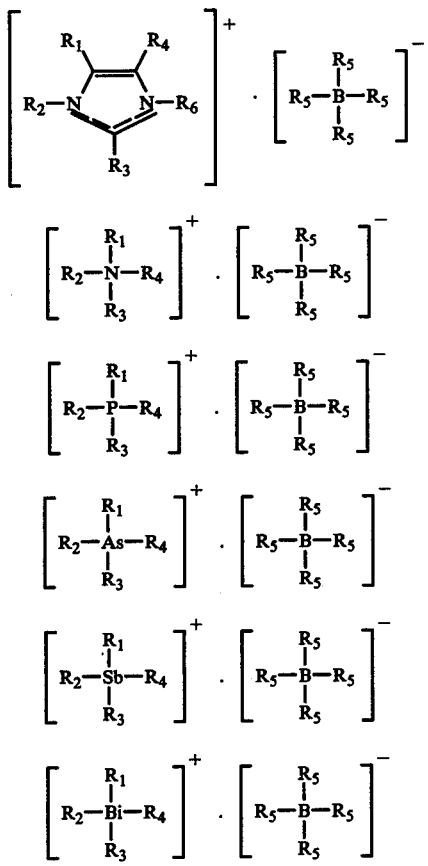

wherein $R_1$, $R_2$, $R_3$, $R_4$ and $R_6$ are independently hydrogen, alkyl preferably having 1 to 11 carbon atoms, alkenyl preferably having 1 to 11 carbon atoms, phenyl or aralkyl and $R_5$ is phenyl or aralkyl. Among them, those containing N and P are preferable because of easy availability and good workability.

The curing agent is preferably used in a proportion of 0.1 to 10.0% by weight based on the weight of the thermosetting resin composition.

The thermosetting resin composition can contain, if desired, inorganic filler such as silica, clay, plaster, quartz glass powder, calcium carbonate, kaolin, mica, hydrated alumina, talc, dolomite, zircon, titanium oxide, magnesite, molybdenum disulfide, antimony trioxide, antimony sulfide, bismuth sulfide, triphenyl antimony, chloride, and the like.

If a coupling agent is added to the thermosetting resin composition in order to make the inorganic filler more compatible with the resin, the viscosity of casting resin is lowered and workability is increased, and resistance to moisture after cured is improved. As the coupling agents, those of epoxy silane series and of amino silane series are preferable.

Since cured articles obtained from the thermosetting resin compositions of this invention by conventional techniques such as casting, dripping, dipping, impregnating, injection-molding are excellent in heat resistance, crack resistance and fire resistance, the thermosetting resin compositions can be used for producing sealing or molding mediums for electronic parts or electric devices and the like. Further since the resin compositions of this invention can be liquid at room temperature, they can be used as solvent-free varnishes having excellent workability.

This invention is illustrated by way of the following examples in which all parts and percents are by weight unless otherwise specified.

EXAMPLES 1-3

A mixture (A) was prepared by mixing 100 parts of diglycidyl ether of bisphenol A (epoxy equivalent 174), 200 parts of diphenylmethane diisocyanate (isocyanate equivalent 140), and 0.5 part of N,N-dimethylbenzylamine. To the mixture (A), polybutadiene (I) having terminal hydroxyl groups (NISSOPB G-1000, manufactured by Nippon Soda Co., Ltd., molecular weight 1000, 1,2 content 90%) was added in amounts as shown in Table 1. The resulting composition was cured by heating at 80° C. for 1 hour and at 180° C. for 15 hours. Heat distortion temperature was measured in order to evaluate heat resistance.

Crack resistance was evaluated as follows. In a test tube having a diameter of 18 mm, a bundle of 30 insulating wires coated with polyamide-imide resin (AIW, each having a diameter of 2.0 mm and a length of 10 cm) was placed and the composition mentioned above was poured thereinto and subjected to curing under the same conditions as mentioned above to give a mold sample. Using the resulting sample, there was carried out a thermal recycling test in which the sample was allowed to stand at an upper temperature for 1 hour and then immediately it was allowed to stand at a lower temperature for 1 hour, and these operations (1 cycle) were repeated until cracks were generated. The upper temperature was fixed at room temperature and the lower temperature was changed from 0° C. to −10° C., −20° C., −30° C., −40° C., −50° C., −60° C. with the lapse of one cycle. Crack resistance was evaluated by the temperature at which cracks were generated.

The results are as shown in Table 1.

EXAMPLES 4-6

To the mixture (A) obtained in Example 1, polybutadiene (II) having terminal hydroxyl groups (NISSO-PB G-3000, manufactured by Nippon Soda Co., Ltd., molecular weight 3000, 1,2 content 90%) was added in amounts as shown in Table 1. Using the resulting compositions, heat resistance and crack resistance were evaluated in the same manner as described in Example 1. The results are as shown in Table 1.

COMPARATIVE EXAMPLE 1

The mixture (A) obtained in Example 1 alone was cured in the same manner as described in Example 1 and heat resistance and crack resistance were measured in the same manner as described in Example 1. The results are as shown in Table 1.

EXAMPLES 7-8

A mixture (B) was prepared by mixing 100 parts of diglycidyl ether of bisphenol A (epoxy equivalent 174), 200 parts of diphenylmethane diisocyanate (isocyanate equivalent 140), and 0.5 part of 1-cyanoethyl-2-ethyl-4-methylimidazole (molecular weight 163). To the mixture (B), polybutadiene (II) as used in Examples 4-6 and polybutadiene (III) having terminal hydroxyl groups (NISSO-PB G-5000, manufactured by Nippon Soda Co., Ltd., molecular weight 5000, 1,2 content 90%) were added in amounts as shown in Table 1. Further, powdered molten quartz glass was also added gradually thereto in amounts as shown in Table 1 with stirring so as to be sufficiently dispersed. Then the mixture was degassed under a pressure of 1 mmHg for about 5 minutes to give a composition. Using the resulting compositions, heat resistance and crack resistance were evaluated in the same manner as described in Example 1. The results are as shown in Table 1.

COMPARATIVE EXAMPLE 2

To the mixture (B) obtained in Example 7, 300 parts of powdered molten quartz glass (100-350 mesh, Tyler standard) was added gradually with stirring so as to be sufficiently dispersed. Using the resulting mixture, heat resistance and crack resistance were evaluated in the same manner as described in Example 1. The results are as shown in Table 1.

As is clear from the results in Table 1, addition of the polybutadienes having terminal hydroxyl groups of the mixture of a polyfunctional epoxy compound, a polyfunctional isocyanate and a curing agent can improve crack resistance remarkably without lowering heat resistance of cured articles.

Table 1

| | | Example | | | | | | | | Comparative Example | |
|---|---|---|---|---|---|---|---|---|---|---|---|
| | | 1 | 2 | 3 | 4 | 5 | 6 | 7 | 8 | 1 | 2 |
| Composition (parts) | Polybutadiene (I) | 20 | 50 | 100 | — | — | — | — | — | — | — |
| | Polybutadiene (II) | — | — | — | 20 | 50 | 100 | 40 | 90 | — | — |
| | Polybutadiene (III) | — | — | — | — | — | — | 10 | 10 | — | — |
| | Quartz glass powder (100 - 350 mesh) | — | — | — | — | — | — | 350 | 400 | — | 300 |
| | Diglycidyl ether of bisphenol A | 100 | 100 | 100 | 100 | 100 | 100 | 100 | 100 | 100 | 100 |
| | Diphenylmethane diisocyanate | 200 | 200 | 200 | 200 | 200 | 200 | 200 | 200 | 200 | 200 |
| | N,N-Dimethylbenzylamine | 0.5 | 0.5 | 0.5 | 0.5 | 0.5 | 0.5 | — | — | 0.5 | 0.5 |
| | 1-Cyanoethyl-2-ethyl-4-methylimidazole | — | — | — | — | — | — | 0.5 | 0.5 | — | — |
| Heat distortion temperature (°C) | | >220 | >220 | 200 | >220 | >220 | 200 | >220 | >220 | >220 | >220 |
| Crack generating temperature (°C) | | −30 | −50 | −60> | −30 | −50 | −60> | −60> | −60> | *1 | −10 |

Note) *1 Cracks were generated at the curing.

EXAMPLES 9-16

Mixtures of diglycidyl ether of bisphenol A (epoxy equivalent 174), diphenylmethane diisocyanate (isocyanate equivalent 140) and a curing agent, N,N-dimethylbenzylamine or 1-cyanoethyl-2-ethyl-4-methylimidazole, were prepared in the proportions as shown in Table 2. To the mixtures, a copolymer of butadiene and acrylonitrile having terminal amino groups (Hycar ATBN 1300 × 16, manufactured by Ube Industries, Ltd., acrylonitrile content 18%, molecular weight 3,400, a = 0.8, b = 0.2) was added in amounts as shown in Table 2, respectively, and in Examples 15 and 16 powdered molten quartz glass (100-350 mesh in Tyler standard) was also mixed with sufficient stirring in amounts as shown in Table 2 to give thermosetting resin compositions. Using the resulting compositions, heat resistance and crack resistance were evaluated in the same manner as described in Example 1. The results are as shown in Table 2.

COMPARATIVE EXAMPLES 3-4

Mixtures containing no copolymer of butadiene and acrylonitrile having terminal amino groups as shown in Table 2 were cured and heat resistance and crack resistance were evaluated in the same manner as described in Example 1. The results are as shown in Table 2.

As is clear from the results in Table 2, remarkable improvement in crack resistance without lowering heat resistance was obtained by addition of the polybutadiene type polymers having terminal amino groups.

Table 2

| | | Example | | | | | | | | Comparative Example | |
|---|---|---|---|---|---|---|---|---|---|---|---|
| | | 9 | 10 | 11 | 12 | 13 | 14 | 15 | 16 | 3 | 4 |
| Composition | Hycar ATBN 1300 × 16 | 50 | 70 | 90 | 50 | 70 | 90 | 80 | 80 | — | — |
| | Diglycidyl ether of bisphenol A | 100 | 100 | 100 | 100 | 100 | 100 | 100 | 100 | 100 | 100 |
| | Diphenylmethane diisocyanate | 115 | 115 | 115 | 230 | 230 | 230 | 115 | 115 | 115 | 115 |

Table 2-continued

| | | Example | | | | | | | | Comparative Example | |
|---|---|---|---|---|---|---|---|---|---|---|---|
| | | 9 | 10 | 11 | 12 | 13 | 14 | 15 | 16 | 3 | 4 |
| tion (parts) | Quartz glass powder (100 - 350 mesh) | — | — | — | — | — | — | 380 | 430 | — | 430 |
| | N,N-Dimethylbenzyl-amine | 0.3 | 0.3 | 0.3 | 0.6 | 0.6 | 0.6 | — | — | 0.3 | — |
| | 1-Cyanoethyl-2-ethyl-4-methyl-imidazole | — | — | — | — | — | — | 0.5 | 0.5 | — | 0.5 |
| Heat distortion temperature (° C) | | >220 | >220 | >220 | >220 | >220 | >200 | >220 | >220 | >220 | >220 |
| Crack generating temperature (° C) | | −50 | −60> | −60> | −50 | −60> | −60> | −60> | −60> | *1 | −10 |

Note) *1: Cracks were generated at the curing.

EXAMPLES 17–19

Reaction product (I) was obtained by heating 100 parts of a copolymer of butadiene and acrylonitrile having terminal carboxyl groups (Hycar CTBN 1300 × 8, manufactured by Ube Industries Ltd., acrylonitrile content 18%, molecular weight 3,400) and 50 parts of diglycidyl ether of bisphenol A (epoxy equivalent 174), under a nitrogen stream at 120°–170° C. for 5 hours.

On the other hand, a mixture (C) was prepared by mixing 100 parts of diglycidyl ether of bisphenol A (epoxy equivalent 174), 200 parts of diphenylmethane diisocyanate (isocyanate equivalent 140), and 1.0 part of 2-phenylimidazol. Reaction product (I) was mixed with the mixture (C) in the proportions as listed in Table 3 to give the desired compositions. The resulting compositions were cured at 70° C. for 5 hours, at 160° C. for 5 hours and at 180° C. for 10 hours. Heat distortion temperature was measured in order to evaluate heat resistance. Crack resistance was evaluated in the same manner as described in Example 1 except for employing the curing conditions mentioned above.

The results are as shown in Table 3.

EXAMPLES 20–22

Reaction product (II) was obtained by heating 100 parts of a copolymer of butadiene and acrylonitrile having terminal carboxyl groups (Hycar CTBN 1300 × 13, manufactured by Ube Industries Ltd., acrylonitrile content 27%, molecular weight 3,400), 20 parts of diglycidyl ether of bisphenol A (epoxy equivalent 500), and 0.15 parts of triphenyl phosphine under a nitrogen stream at 120°–150° C. for 5 hours.

To the mixture (C) obtained in Example 17, Reaction product (II) was added in amounts as listed in Table 3 to give the desired compositions. Using the resulting compositions, heat resistance and crack resistance were evaluated in the same manner as described in Example 17. The results are as shown in Table 3.

EXAMPLES 23–25

Reaction product (III) was obtained by heating 100 parts of a copolymer of butadiene and acrylonitrile having terminal carboxyl groups (Hycar CTBN 1300 × 8, used in Examples 17–19), 100 parts of diglycidyl ether of bisphenol A (epoxy equivalent 174), and 0.2 part of triphenyl phosphine under a nitrogen stream at 100°–130° C. for 5 hours.

To the mixture (C) obtained in Example 17, Reaction product (III) was added in amounts as listed in Table 3 to give the desired compositions. Using the resulting compositions, heat resistance and crack resistance were evaluated in the same manner as described in Example 17. The results are as shown in Table 3.

EXAMPLES 26–28

Reaction product (IV) was obtained by heating 100 parts of a copolymer of butadiene and acrylonitrile having terminal hydroxyl groups (liquid rubber Poly bd® CN-15, manufactured by Idemitsu Petrochemical Co., Ltd., acrylonitrile content 15%, molecular weight 4,500, a = 0.85 and b = 0.15), 50 parts of diglycidyl ether of bisphenol A (epoxy equivalent 174), and 1.5 parts of sodium ethylate under a nitrogen stream at 120°–170° C. for 5 hours.

To the mixture (C) obtained in Example 17, Reaction product (IV) was added in amounts as listed in Table 3 to give the desired compositions. Using the resulting compositions, heat resistance and crack resistance were evaluated in the same manner as described in Example 17. The results are as shown in Table 3.

EXAMPLES 29–31

Reaction product (V) was obtained by heating 100 parts of a copolymer of butadiene and styrene having terminal hydroxyl groups (liquid rubber Poly bd® CS-15, maufactured by Idemitsu Petrochemical Co., Ltd., styrene content 25%, molecular weight 3,000, a = 0.75 and b = 0.25), 100 parts of diglycidyl ether of bisphenol A (epoxy equivalent 174), and 1.5 parts of sodium ethylate under a nitrogen stream at 120°–170° C. for 5 hours.

To the mixture (C) obtained in Example 17, Reaction product (V) was added in amounts as listed in Table 3 to give the desired compositions. Using the resulting compositions, heat resistance and crack resistance were evaluated in the same manner as described in Example 17. The results are as shown in Table 3.

COMPARATIVE EXAMPLE 5

The mixture (C) obtained in Example 17 alone was cured and heat resistance and crack resistance were evaluated in the same manner as described in Example 17. The results are as shown in Table 3.

Table 3

| | Example | | | | | | | | | | | | | | | *1 |
|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 5 |
| Reaction product (I) | 31 | 40 | 53 | — | — | — | — | — | — | — | — | — | — | — | — | — |

Table 3-continued

| | | Example | | | | | | | | | | | | | | | *1 |
|---|---|---|---|---|---|---|---|---|---|---|---|---|---|---|---|---|---|
| | | 17 | 18 | 19 | 20 | 21 | 22 | 23 | 24 | 25 | 26 | 27 | 28 | 29 | 30 | 31 | 5 |
| Composition (parts) | Reaction product (II) | — | — | — | 23 | 32 | 43 | — | — | — | — | — | — | — | — | — | — |
| | Reaction product (III) | — | — | — | — | — | — | 41 | 57 | 75 | — | — | — | — | — | — | — |
| | Reaction product (IV) | — | — | — | — | — | — | — | — | — | 31 | 40 | 53 | — | — | — | — |
| | Reaction product (V) | — | — | — | — | — | — | — | — | — | — | — | — | 23 | 32 | 43 | — |
| | Diglycidyl ether of bisphenol A | 100 | 100 | 100 | 100 | 100 | 100 | 100 | 100 | 100 | 100 | 100 | 100 | 100 | 100 | 100 | 100 |
| | Diphenylmethane diisocyanate | 200 | 200 | 200 | 200 | 200 | 200 | 200 | 200 | 200 | 200 | 200 | 200 | 200 | 200 | 200 | 200 |
| | 2-Phenylimidazole | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Heat distortion temperature (° C) | | >200 | >200 | Below | >200 | >200 | Below | >200 | >200 | Below | >200 | >200 | Below | >200 | >200 | Below | >200 |
| Crack generating temperature (° C) | | −40 | −50 | −60 | −40 | −50 | −60 | −40 | −50 | −60 | −40 | −50 | −60 | −40 | −50 | −60 | *2 |

Note):
*1: Comparative Example
*2: Cracks were generated at the curing.

As is clear from the results in Table 3, remarkable improvement in crack resistance without lowering heat resistance was obtained by addition of the reaction products of polyfunctional epoxy compounds and polybutadiene type polymers having terminal hydroxyl groups or terminal carboxyl groups.

EXAMPLES 32–41

Reaction product (VI) was obtained by heating 100 parts of brominated diglycidyl ether of bisphenol A (epoxy equivalent 350, bromine content 48%), 100 parts of a copolymer of butadiene and acrylonitrile having terminal hydroxyl groups (liquid rubber Poly bd ® CN - 15, used in Examples 26–28) and 1.5 parts of sodium ethylate under a nitrogen stream at 120°–150° C. for 5 hours. Reaction product (VI) was brown and had a viscosity of about 500 poise at room temperature.

Using Reaction product (VI), the desired compositions were prepared as listed in Table 4. The resulting compositions were cured at 80° C. for 1 hour, at 160° C. for 5 hours and at 180° C. for 14 hours. Heat distortion temperature was measured in order to evaluate heat resistance. Firing resistance test according to UL standard, Subjects 94 and 492 was carried out in order to evaluate fireproofing. Crack resistance was evaluated in the same manner as described in Example 1 except for employing the curing conditions mentioned above.

The results are as shown in Table 4.

For comparison, a composition containing no Reaction product (VI) was also tested. (Comparative Example 6).

Table 4

| | | Example | | | | | | | | | | *1 |
|---|---|---|---|---|---|---|---|---|---|---|---|---|
| | | 32 | 33 | 34 | 35 | 36 | 37 | 38 | 39 | 40 | 41 | 6 |
| Composition (parts) | Reaction product (VI) | 30 | 30 | 30 | 30 | 60 | 60 | 60 | 90 | 90 | 90 | — |
| | Diglycidyl ether of bisphenol A (epoxy equivalent 174) | 100 | 90 | 80 | 70 | 100 | 90 | 80 | 100 | 90 | 80 | 90 |
| | Diphenylmethane diisocyanate (isocyanate equivalent 140) | 200 | 200 | 200 | 400 | 200 | 200 | 200 | 200 | 200 | 200 | 200 |
| | N-Methyl morpholine | 1.0 | 1.0 | 1.0 | 1.0 | 1.0 | 1.0 | 1.0 | 1.0 | 1.0 | 1.0 | 1.0 |
| | Polyglycidyl ether of phenol-formaldehyde novolac (epoxy equivalent 175) | — | 10 | 20 | 30 | — | 10 | 20 | — | 10 | 20 | 10 |
| Heat distortion temperature (° C) | | >200 | >200 | >200 | >200 | >200 | >200 | >200 | >200 | >200 | >200 | >200 |
| Crack generating temperature (° C) | | −20 | −20 | −20 | −10 | −30 | −30 | −30 | −50 | −50 | −50 | *2 |
| Fire resistance (UL standard) | | SE-I | SE-I | SE-I | SE-O | SE-O | SE-O | SE-O | SE-O | SE-O | SE-O | — |

Note)
*1 Comparative Example
*2 Cracks were generated at the curing.

EXAMPLES 42–51

Reaction product (VII) was obtained by heating 100 parts of brominated diglycidyl ether of bisphenol A (epoxy equivalent 480, bromine content 20%), 100 parts of a copolymer of butadiene and acrylonitrile having terminal hydroxyl groups (liquid rubber Poly bd ® CN - 15, used in Examples 32–41) and 1.5 parts of sodium ethylate under a nitrogen stream at 120°–170° C. for 5 hours.

Using Reaction product (VII), the desired compositions were prepared as listed in Table 5. Using the resulting compositions, heat resistance, crack resistance and fire resistance were evaluated in the same manner as described in Example 32. The results are as shown in Table 5.

For comparison, a composition containing no Reaction product (VII) was also tested. (Comparative Example 7)

EXAMPLES 52–61

Reaction product (VIII) was obtained by heating 100 parts of brominated diglycidyl ether of bisphenol A (epoxy equivalent 350, bromine content 48%), 100 parts of a copolymer of butadiene and acrylonitrile having terminal carboxyl groups (Hycar CTBN 1300 × 8, used in Examples 17-19) and 0.2 part of triphenylamine under a nitrogen stream at 120°-170° C. for 5 hours.

Using Reaction product (VIII), the desired compositions were prepared as listed in Table 6. Using the resulting compositions, heat resistance, crack resistance and fire resistance were evaluated in the same manner as described in Example 32. For comparison, a composition containing no Reaction product (VIII) was also tested. (Comparative Example 8) The results are as shown in Table 6.

(epoxy equivalent 350, bromine content 48%), 100 parts of a copolymer of butadiene and acrylonitrile having terminal carboxyl groups (Hycar CTBN 1300 × 13, used in Examples 20-22) and 0.2 part of triphenylamine under a nitrogen stream at 120°-170° C. for 5 hours.

Using Reaction product (IX), the desired compositions were prepared as listed in Table 7. Using the resulting compositions, heat resistance, crack resistance and fire resistance were evaluated in the same manner as described in Example 32. For comparison, a composi- Table 5

| | | Example | | | | | | | | | | *1 |
|---|---|---|---|---|---|---|---|---|---|---|---|---|
| | | 42 | 43 | 44 | 45 | 46 | 47 | 48 | 49 | 50 | 51 | 7 |
| Composition (parts) | Reaction product (VII) | 200 | 200 | 200 | 300 | 300 | 399 | 250 | 250 | 250 | 250 | — |
| | Diglycidyl ether of bisphenol A (epoxy equivalent 174) | 100 | 90 | 80 | 100 | 90 | 80 | 100 | 100 | 100 | 100 | 100 |
| | Diphenylmethane diisocyanate (isocyanate equivalent 140) | 200 | 200 | 200 | 200 | 200 | 200 | 200 | 200 | 200 | 200 | 200 |
| | N-Methyl morpholine | 1.0 | 1.0 | 1.0 | 1.0 | 1.0 | 1.0 | 0.5 | 1.0 | 1.5 | 2.0 | 1.0 |
| | Polyglycidyl ether of phenol-formaldehyde novolac (epoxy equivalent 175) | — | 10 | 20 | — | 10 | 20 | — | — | — | — | — |
| Heat distortion temperature (° C) | | >200 | >200 | >200 | >200 | >200 | >200 | >200 | >200 | >200 | >200 | >200 |
| Crack generating temperature (° C) | | Below −60 | Below −60 | Below −60 | Below −60 | Below −60 | Below −60 | Below −60 | Below −60 | Below −60 | Below −60 | *2 |
| Fire resistance (UL standard) | | SE-O | SE-O | SE-O | SE-O | SE-O | SE-O | SE-O | SE-O | SE-O | SE-O | — |

Note)
*1: Comparative Example
*2: Cracks were generated at the curing.

Table 6

| | | Example | | | | | | | | | | *1 |
|---|---|---|---|---|---|---|---|---|---|---|---|---|
| | | 52 | 53 | 54 | 55 | 56 | 57 | 58 | 59 | 60 | 61 | 8 |
| Composition (parts) | Reaction product (VIII) | 30 | 30 | 30 | 60 | 60 | 60 | 90 | 90 | 100 | 150 | — |
| | Diglycidyl ether of bisphenol A (epoxy equivalent 174) | 100 | 90 | 80 | 100 | 90 | 80 | 100 | 80 | 100 | 100 | 100 |
| | Diphenylmethane diisocyanate (isocyanate equivalent 140) | 200 | 200 | 800 | 200 | 200 | 200 | 200 | 200 | 200 | 200 | 200 |
| | N-Methyl morpholine | 0.8 | 0.8 | 0.8 | 0.8 | 0.8 | 0.8 | 0.8 | 0.8 | 0.8 | 0.8 | 0.8 |
| | Polyglycidyl ether of phenol-formaldehyde novolac (epoxy equivalent 175) | — | 10 | 20 | — | 10 | 20 | — | 20 | — | — | — |
| Heat distortion temperature (° C) | | >200 | >200 | >200 | >200 | >200 | >200 | >200 | >200 | >200 | >200 | >200 |
| Crack generating temperature (° C) | | −30 | −30 | −30 | −60 | −60 | −60 | Below −60 | Below −60 | Below −60 | Below −60 | *2 |
| Fire resistance (UL standard) | | SE-I | SE-I | SE-I | SE-O | SE-O | SE-O | SE-O | SE-O | SE-O | SE-O | — |

Note)
*1: Comparative Example
*2: Cracks were generated at the curing.

EXAMPLES 62-71

Reaction product (IX) was obtained by heating 100 parts of brominated diglycidyl ether of bisphenol A tion containing no Reaction product (IX) was also tested. (Comparative Example 9) The results are as shown in Table 7.

Table 7

| | | Example | | | | | | | | | | *1 |
|---|---|---|---|---|---|---|---|---|---|---|---|---|
| | | 62 | 63 | 64 | 65 | 66 | 67 | | 68 | 70 | 71 | 9 |
| Composition (parts) | Reaction product (IX) | — | 60 | 60 | 60 | 60 | 90 | 90 | 90 | 100 | 100 | — |
| | Diglycidyl ether of bisphenol A (epoxy equivalent 174) | 100 | 90 | 80 | 100 | 100 | 100 | 90 | 80 | 100 | 100 | 100 |
| | Diphenylmethane diisocyanate (isocyanate equivalent 140) | 800 | 600 | 400 | 180 | 220 | 200 | 200 | 200 | 400 | 600 | 200 |
| | Benzyldimethylamine | 1.0 | 1.0 | 1.0 | 1.0 | 1.0 | 1.0 | 1.0 | 1.0 | 1.5 | 1.5 | 1.0 |
| | Dibromophenyl glycidyl ether (epoxy equivalent 308) | — | 10 | 20 | — | — | — | 10 | 20 | — | 10 | — |
| Heat distortion temperature (° C) | | >200 | >200 | >200 | >200 | >200 | >200 | >200 | >200 | >200 | >200 | >200 |
| Crack generating temperature (° C) | | −30 | −30 | −30 | −30 | −30 | −50 | −50 | −50 | Below −60 | Below −60 | *2 |

Table 7-continued

| | Example | | | | | | | | | *1 |
|---|---|---|---|---|---|---|---|---|---|---|
| | 62 | 63 | 64 | 65 | 66 | 67 | 68 | 70 | 71 | 9 |
| Fire resistance (UL standard) | SE-O | SE-O | SE-O | SE-O | SE-O | SE-O | SE-O | SE-O | SE-O | — |

Note)
*1: Comparative Example
*2: Cracks were generated at the curing.

EXAMPLES 72–78

Reaction product (X) was obtained by heating 100 parts of brominated diglycidyl ether of bisphenol A (epoxy equivalent 350, bromine content 48%), 100 parts of a copolymer of butadiene and styrene having terminal hydroxyl groups (styrene content 25%, molecular weight 3,000) and 0.3 part of triphenylamine under a nitrogen stream at 120°–170° C. for 5 hours.

Using Reaction product (X), the desired compositions were prepared as listed in Table 8. Using the resulting compositions, heat resistance, crack resistance and fire resistance were evaluated in the same manner as described in Example 32. For comparison, a composition containing no Reaction product (X) was also tested. (Comparative Example 10) The results are as shown in Table 8.

As mentioned above, according to this invention, thermosetting resin compositions having excellent heat resistance, crack resistance and fire resistance can be obtained. Further, since the resin compositions obtained are liquid at room temperature, they can be used as solvent-free varnishes having excellent workability and their applications can be expected more widely than conventional compositions using halogen compounds.

Table 8

| | | Example | | | | | | | *1 |
|---|---|---|---|---|---|---|---|---|---|
| | | 72 | 73 | 74 | 75 | 76 | 77 | 78 | 10 |
| Composition (parts) | Reaction product (X) | 60 | 90 | 120 | 60 | 90 | 120 | 120 | — |
| | Diglycidyl ether of bisphenol A epoxy equivalent 174) | 100 | 100 | 100 | 90 | 90 | 90 | 100 | 100 |
| | Diphenylmethane diisocyanate (isocyanate equivalent 140) | 200 | 200 | 200 | 200 | 200 | 200 | 200 | 200 |
| | N-Methyl morpholine | 1.5 | 1.5 | 1.5 | 1.5 | 1.5 | 1.5 | 1.0 | 1.5 |
| Heat distortion temperature (° C) | | >200 | >200 | >200 | >200 | >200 | >200 | >200 | >200 |
| Crack generating temperature (° C) | | −30 | −40 | −50 | −30 | −40 | −50 | −50 | *2 |
| Fire resistance (UL standard) | | SE-O | SE-O | SE-O | SE-O | SE-O | SE-O | SE-O | — |

Note)
*1: Comparative Example
*2: Cracks were generated at the curing.

What is claimed is:

1. A thermosetting resin composition comprising
   (a) one or more polyfunctional epoxy compounds,
   (b) one or more polyfunctional isocyanates,
   (c) one or more curing agents, and
   (d) at least one flexibility imparting agent selected from the group consisting of
      a polymer of butadiene having terminal amino groups represented by the formula:

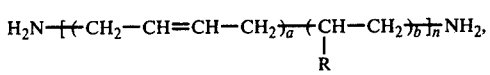

or

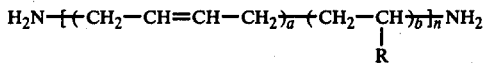

wherein R is hydrogen, alkyl, alkenyl, nitrilo, or phenyl; a ≧ 0.7, b ≦ 0.3, and a + b = 1; and n is an integer which determines the molecular weight of the polymer of butadiene in the range of from 500 to 5,000, a polybutadiene having terminal hydroxyl groups represented by the formula:

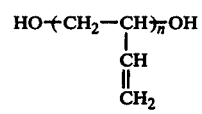

wherein n is an integer which determines the molecular weight of the polybutadiene in the range of from 500 to 5,000, a reaction product obtained by reacting a polyfunctional epoxy compound or an epoxy compound containing one or more halogen atoms with a copolymer of butadiene of the formula:

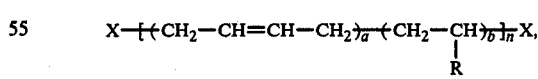

or

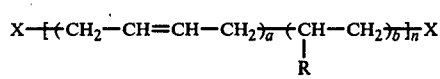

wherein X is hydroxyl or carboxyl; and R, a, b and n are as defined above.

2. A composition according to claim 1, wherein the curing agent is at least one member selected from the group consisting of amines, quaternary ammonium salts and imidazoles.

3. A composition according to claim 1, wherein the component (d) is contained in an amount of from 3 to 100 parts by weight per 100 parts by weight of the total of the components (a), (b) and (c).

4. A composition according to claim 1, wherein at least one of the polyfunctional epoxy compound and the polyfunctional isocyanate contains one or more halogen atoms in the molecule.

5. A composition according to claim 1, wherein the polyfunctional epoxy compound is diglycidyl ether of bisphenol A.

6. A composition according to claim 1, wherein the polyfunctional epoxy compound is polyglycidyl ether of phenol-formaldehyde novolac.

7. A composition according to claim 1, wherein the polyfunctional isocyanate is diphenylmethane diisocyanate.

8. A composition according to claim 1, wherein the flexibility imparting agent is a polybutadiene having terminal hydroxyl groups.

9. A composition according to claim 1, wherein the flexibility imparting agent is a copolymer of butadiene and acrylonitrile having terminal amino groups or terminal carboxyl groups.

10. A composition according to claim 1, wherein the flexibility imparting agent is a reaction product of diglycidyl ether of bisphenol A and a copolymer of butadiene and acrylonitrile having terminal hydroxyl groups or terminal carboxyl groups.

11. A composition according to claim 1, wherein the flexibility imparting agent is a reaction product of a halogenated diglycidyl ether of bisphenol A and a copolymer of butadiene and acrylonitrile having terminal hydroxyl groups or terminal carboxyl groups.

* * * * *